United States Patent
Oduro (10) Patent No.: US 11,535,790 B2
(45) Date of Patent: Dec. 27, 2022

(54) MULTIVALENT IRON BIO-INHIBITOR FROM WASTE BAUXITE RESIDUE TO CONTROL RESERVOIR SOURING

(71) Applicant: Saudi Arabian Oil Company, Dhahran (SA)

(72) Inventor: Harry Daniel Oduro, Dhahran (SA)

(73) Assignee: Saudi Arabian Oil Company, Dhahran (SA)

(\*) Notice: Subject to any disclaimer, the term of this patent is extended or adjusted under 35 U.S.C. 154(b) by 131 days.

(21) Appl. No.: 17/012,318

(22) Filed: Sep. 4, 2020

(65) Prior Publication Data

US 2022/0073808 A1 Mar. 10, 2022

(51) Int. Cl.
| | | |
|---|---|---|
| C09K 8/532 | (2006.01) | |
| C21B 15/00 | (2006.01) | |
| C02F 1/72 | (2006.01) | |
| C02F 1/70 | (2006.01) | |
| C02F 103/10 | (2006.01) | |
| C02F 103/36 | (2006.01) | |
| C02F 101/10 | (2006.01) | |

(52) U.S. Cl.
CPC ............. *C09K 8/532* (2013.01); *C02F 1/705* (2013.01); *C02F 1/72* (2013.01); *C21B 15/00* (2013.01); *C02F 2101/101* (2013.01); *C02F 2103/10* (2013.01); *C02F 2103/365* (2013.01); *C02F 2203/00* (2013.01); *C02F 2209/26* (2013.01); *C02F 2303/22* (2013.01)

(58) Field of Classification Search
None
See application file for complete search history.

(56) References Cited

U.S. PATENT DOCUMENTS

| | | |
|---|---|---|
| 5,026,491 A | 6/1991 | Greenley et al. |
| 5,053,144 A | 10/1991 | Szirmai et al. |
| 5,405,531 A | 4/1995 | Hitzman et al. |
| 8,252,576 B2 | 8/2012 | Campbell et al. |
| 8,585,899 B2 | 11/2013 | Baldwin et al. |
| 8,846,732 B2 | 9/2014 | Jenneman et al. |
| 9,365,845 B2 * | 6/2016 | Coates ............... C12N 9/99 |
| 2007/0215344 A1 | 9/2007 | McElhiney et al. |
| 2009/0180992 A1 | 7/2009 | Summer et al. |
| 2013/0312974 A1 | 11/2013 | McClung |
| 2014/0303045 A1 * | 10/2014 | Campbell ............ A01N 43/80 507/237 |
| 2015/0175877 A1 * | 6/2015 | Shindgikar ......... C09K 8/602 507/217 |

(Continued)

FOREIGN PATENT DOCUMENTS

| | | |
|---|---|---|
| WO | WO2005077830 | 8/2005 |
| WO | WO2015034845 | 3/2015 |

OTHER PUBLICATIONS

Basafa et al., "Reservoir souring: sulfur chemistry in offshore oil and gas reservoir fluids" Journal of Petroleum Exploration and Production Technology 9.2, Jun. 2019, 1105-1118, 14 pages.

(Continued)

*Primary Examiner* — John J Figueroa
(74) *Attorney, Agent, or Firm* — Fish & Richardson P.C.

(57) ABSTRACT

This disclosure relates to a method of fabricating a multivalent iron bio-inhibitor from waste bauxite residue and methods of controlling reservoir souring using the multivalent iron bio-inhibitor.

15 Claims, 4 Drawing Sheets

(56) References Cited

U.S. PATENT DOCUMENTS

2017/0198196 A1* 7/2017 Coates .................... C02F 1/50

OTHER PUBLICATIONS

Brunner et al., "A Revised Isotope Fractionation Model for Dissimilatory Sulfate Reduction in Sulfate Reducing Bacteria" Geochimica et Cosmochimica Acta 69.20, Apr. 2005, 4759-4771, 13 pages.
Gieg et al., "Biological Souring and mitigation in oil reservoirs" Applied microbiology and biotechnology 92.2, 2011, 264-283, 20 pages.
Hubert and Voordouw, "Oil Field Souring Control by Nitrate-Reducing *Sulfurospirillum* spp. That Outcompete Sulfate-Reducing Bacteria for Organic Electron Donors" Applied and Environ. Microbiology 73, 2007, 2644-2652, 9 pages.
Jahanbani et al., "A Sulfur and Nitrogen Cycle Informed Model to Simulate Nitrate Treatment of Reservoir Souring" Scientific reports 9.1, May 2019, 12 pages.
Nemati et al., "Mechanistic Study of Microbial Control of Hydrogen Sulfide Production in Oil Reservoirs" Biotechnology and bioengineering 74.5, Oct. 2000, 424-434, 11 pages.
Sim et al., "Quantification and isotopic analysis of intracellularsulfur metabolites in the dissimilatory sulfate reduction pathway" GCA 2016, 57-72, 16 pages.
Xue et al., "Control of Microbial Sulfide Production with Biocides and Nitrate in Oil Reservoir Simulating Bioreactors." Frontiers in microbiology 6, 1387, Dec. 2015, 11 pages.

* cited by examiner

MULTIVALENT IRON BIO-INHIBITOR FROM WASTE BAUXITE RESIDUE TO CONTROL RESERVOIR SOURING

TECHNICAL FIELD

This document relates to a method of fabricating a bio-inhibitor from waste bauxite residue and methods of controlling reservoir souring in oilfields and wastewater treatment using the bio-inhibitor.

BACKGROUND

Reservoir souring (or bio-souring) due to the activity of sulfur-reducing bacteria (SRB) that produces hydrogen sulfide ($H_2S$) in oil reservoirs has a major impact on the quality and efficient recovery of oil and gas. Hydrogen sulfide produced by SRBs contributes to high sulfur content in fuel, which pollutes the environment, affects air quality, and poses health risks. In addition, $H_2S$ production exacerbates pipeline corrosion, causes reservoir scaling, and increases flow assurance challenges by forming metal sulfides and elemental sulfur deposition problems (Basafa and Hawboldt, "Reservoir souring: sulfur chemistry in offshore oil and gas reservoir fluids," J. Petrol. Explor. Prod. Technol., 9:1105-1118 (2019)).

As worldwide demand for oil and gas production has increased, reservoir-souring problems have become more problematic, creating significant operation and maintenance issues associated with high costs. Prevention practices have focused on inhibiting the growth of SRBs with biocides or injecting nitrate solutions in the water phase of the wellhead subsurface or downhole (Gieg et al., "Biological souring and mitigation in oil reservoirs," Appl. Microbiol. Biotechnol, 92(2):263-282 (2011)). However, high nitrate injection rates under reservoir conditions can increase additional biological or abiotic sulfide oxidation processes (via intracellular nitrate reducing-sulfide oxidizing microorganisms), producing sulfide intermediate species ($HS^-/S_n^{2-}$), sulfate ($SO_4^{2-}$) formation via zero-valent elemental sulfur ($S^0$), and sulfur biofilm deposits (Hubert and Voordouw, "Oil field souring control by nitrate-reducing *Sulfurospirillum* spp. that outcompete sulfate-reducing bacteria for organic electron donors," Appl. Environ. Microbiol, 73:2644-2652 (2007); Xue and Voordouw, "Control of microbial sulfide production with biocides and nitrate in oil reservoir simulating bioreactors," Frontiers Microbiol., 6:1387 (2015); Veshareh and Nick, "A sulfur and nitrogen cycle informed model to simulate nitrate treatment of reservoir souring," Sci. Reports, 9:7546 (2019)).

There is a need for a method to prevent large-scale reservoir souring that is effective and reliable and can be used, for example, in oilfield and wastewater applications. Thus, there is also a need for a method to reduce or eliminate $H_2S$ production due to SRB growth in oil and gas fields.

SUMMARY

Provided in this disclosure is a method for treating or preventing reservoir souring, the method comprising: providing a multivalent iron bio-inhibitor product comprising coupled $zFe^0$—$Fe^{2+}$-$Fe^{3+}$ to a reservoir; and inhibiting or terminating the growth, activity, or both, of sulfur-reducing bacteria present in the reservoir.

In some embodiments of the method, the multivalent iron bio-inhibitor product comprises coupled $zFe^0$—$Fe^{2+}$—$Fe^{3+}$ at a concentration ratio of about 4:3:1 to about 3.5:2.5:1. In some embodiments, the multivalent iron bio-inhibitor product is provided to the reservoir at a combined $zFe^0$—$Fe^{2+}$—$Fe^{3+}$ concentration of about 0.1 g/L to about 20 g/L. In some embodiments, the multivalent iron bio-inhibitor product is provided to the reservoir at a combined $zFe^0$—$Fe^{2+}$—$Fe^{3+}$ concentration of about 4 g/L to about 12 g/L. In some embodiments, the multivalent iron bio-inhibitor product comprises heavy metals at a combined concentration of about 0.01 g/L to about 3 g/L.

In some embodiments of the method, the multivalent iron bio-inhibitor product is fabricated from waste bauxite residue.

In some embodiments of the method, the sulfur-reducing bacteria is *Desulfovibrio* species, *Thiobacillus* species, or a combination thereof.

In some embodiments, the method inhibits the formation of hydrogen sulfide ($H_2S$) in the reservoir. In some embodiments, the method removes $H_2S$ present in the reservoir. In some embodiments, the reservoir is an oilfield reservoir, a reservoir in a wastewater treatment facility, or a reservoir in a hydrothermal system.

In some embodiments, the method further comprises fabricating the multivalent iron bio-inhibitor product from waste bauxite residue, wherein the fabricating comprises: treating the waste bauxite residue with an acid solution to form a first mixture; treating the first mixture with a reducing agent to form a second mixture comprising coupled $zFe^0$—$Fe^{2+}$—$Fe^{3+}$; and obtaining the multivalent iron bio-inhibitor product comprising coupled $zFe^0$—$Fe^{2+}$—$Fe^{3+}$ from the second mixture.

Also provided in the present disclosure is a method of fabricating a multivalent iron bio-inhibitor product comprising coupled $zFe^0$—$Fe^{2+}$—$Fe^{3+}$ from waste bauxite residue, the method comprising: treating the waste bauxite residue with an acid solution to form a first mixture; treating the first mixture with a reducing agent to form a second mixture comprising coupled $zFe^0$—$Fe^{2+}$—$Fe^{3+}$; and obtaining the multivalent iron bio-inhibitor product comprising coupled $zFe^0$—$Fe^{2+}$—$Fe^{3+}$ from the second mixture.

In some embodiments of the method, the acid solution comprises perchloric acid ($HClO_4$).

In some embodiments of the method, the reducing agent is sodium borohydride ($NaBH_4$).

In some embodiments of the method, the elemental composition of the waste bauxite residue comprises about 1 wt % to about 50 wt % iron.

In some embodiments of the method, the multivalent iron bio-inhibitor product comprises coupled $zFe^0$—$Fe^{2+}$—$Fe^{3+}$ at a concentration ratio of about 4:3:1. In some embodiments, the multivalent iron bio-inhibitor product comprises coupled $zFe^0$—$Fe^{2+}$—$Fe^{3+}$ at a combined $zFe^0$—$Fe^{2+}$—$Fe^{3+}$ concentration of about 5 g/L to about 50 g/L. In some embodiments, the multivalent iron bio-inhibitor product comprises heavy metals at a combined concentration of about 1 g/L to about 5 g/L.

Also provided in the present disclosure is a method for inhibiting or terminating the growth or activity of sulfur-reducing bacteria in a reservoir, comprising providing a multivalent iron bio-inhibitor product comprising coupled $zFe^0$—$Fe^{2+}$—$Fe^{3+}$ to a reservoir, wherein the multivalent iron bio-inhibitor product is fabricated from waste bauxite residue.

In some embodiments of the method, the method inhibits the formation of $H_2S$ in the reservoir, removes $H_2S$ present in the reservoir, or a combination thereof.

In some embodiments of the method, the sulfur-reducing bacteria is *Desulfovibrio* species, *Thiobacillus* species, or a combination thereof.

In some embodiments of the method, the multivalent iron bio-inhibitor product comprises coupled $zFe^0$—$Fe^{2+}$—$Fe^{3+}$ at a concentration ratio of about 4:3:1.

DETAILED DESCRIPTION

The present disclosure relates to a process of chemically fabricating a multivalent iron bio-inhibitor (MIBI) from bauxite waste residue to prevent the high levels of hydrogen sulfide ($H_2S$) produced by sulfur-reducing bacteria (SRB) in reservoirs. Accordingly, provided is a method of converting waste bauxite residue to a multivalent iron bio-inhibitor product. In some embodiments, the MIBI product contains three coupled iron species ($zFe^0$—$Fe^{2+}$—$Fe^{3+}$) that simultaneously undergo chemical reduction to remove hydrogen sulfide. In some embodiments, the simultaneous reduction is followed by biological sorption of iron to inhibit the growth of SRB in a reservoir. The methods of the present disclosure are facile and cost-effective and can easily be assimilated in wastewater treatment facilities, as well as in oil and gas field operations, to effectively control reservoir souring. The method of the present disclosure is a simple and robust synthetic chemical approach using free bauxite residue to prevent large-scale reservoir souring in conventional and unconventional hydrocarbon fields.

The methods of the present disclosure are advantageous as compared to known methods of preventing and treating reservoir souring. The methods utilize efficient bio-inhibition performance by decreasing time for microbial resistance to develop as well as reacting with the sulfides generated in the reservoir to form soluble or aqueous phase iron sulfide. The improved bio-inhibition products in oilfield settings can lead to effective SRB treatment and lower levels of $H_2S$, leading to lower costs in oil and gas production. The methods of the present disclosure are cost-effective, particularly when compared to biocide and nitrate products typically used to treating reservoir souring challenges in upstream and downstream operations. The methods of the present disclosure can be used in hydrocarbon industrial sectors, but can also be used in any industry where the control of SRBs and the concomitant production of hydrogen sulfide is desired.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Method of Fabricating a Multivalent Iron Bio-Inhibitor (MIBI) Product

Waste bauxite residue, also known as red mud, bauxite tailings, or alumina refinery residue, is a highly alkaline and noxious waste product of the Bayer process comprising mainly iron oxide along with alkali such as sodium hydroxide. The Bayer process is responsible for over 95% of all alumina produced globally, and for every ton of alumina produced via the Bayer process, approximately 1 to 1.5 tons of bauxite residue is produced. Waste bauxite residue generated during the extraction of alumina from bauxite ore is characterized by high pH (typically between pH 11-14) and high concentrations of soluble ions, with low or virtually no organic matter. Though the high alkalinity of the waste bauxite can cause environmental problems, the present disclosure describes methods of using the waste bauxite to remedy problems encountered in convention and unconventional hydrocarbon fields, such as in oilfield and wastewater applications. Provided in the present disclosure is a method of chemically fabricating a bio-inhibitor from the free waste products of waste bauxite. In some embodiments, the bio-inhibitor is used to effectively suppress the activity of sulfur-reducing bacteria (SRB) in a reservoir. In some embodiments, the suppression of activity of the SRB suppresses or prevents the production of hydrogen sulfide in the reservoir.

Provided in the present disclosure is a method of fabricating a multivalent iron bio-inhibitor (MIBI) product that contains coupled $zFe^0$—$Fe^{2+}$—$Fe^{3+}$ from waste bauxite residue. In some embodiments, the method includes: treating waste bauxite residue with an acid solution to form a first mixture; treating the first mixture with a reducing agent to form a second mixture containing coupled $zFe^0$—$Fe^{2+}$—$Fe^{3+}$; and obtaining a multivalent iron bio-inhibitor product containing coupled $zFe^0$—$Fe^{2+}$—$Fe^{3+}$ from the second mixture.

In the methods of the present disclosure, a multivalent iron bio-inhibitor product is fabricated from waste bauxite residue. In some embodiments, the waste bauxite residue is recovered after alumina production. In some embodiments, the waste bauxite residue has a pH between about 11 and about 14, such as between about 12 and 14, or about 13.

In some embodiments, the waste bauxite residue contains one or more minerals. Examples of minerals that can be present in the waste bauxite residue include, but are not limited to, larnite ($Ca_2(SiO_4)$), cancrinite (($Na,Ca)_8(AlSiO_4)_6(CO_3,SO_4)_2.2H_2O$), hematite ($Fe_2O_3$), goethite ($FeO(OH)$), calcite ($CaCO_3$), perovskite ($CaTiO_3$), grossite ($CaAl_4O_7$), quartz ($SiO_2$), gibbsite ($Al(OH)_3$), and combinations thereof. In some embodiments, the mineralogical composition of the waste bauxite residue is determined by X-ray powder diffraction (XRD).

In some embodiments, the elemental composition of the waste bauxite residue contains one or more elements that include, but are not limited to, Fe, Al, Na, Si, Ca, Ti, S, Zn, Sr, Mg, P, Cr, K, Mn, Ce, Pb, Ni, Th, and combinations thereof. In some embodiments, the elemental composition the waste bauxite residue is determined by XRD. In some embodiments, the elemental composition of the waste bauxite residue comprises about 1 wt % to about 50 wt % iron, such as about 10 wt % to about 40 wt %, about 20 wt % to about 35 wt %, about 25 wt % to about 30 wt %, or about 1 wt %, 5 wt %, 10 wt %, 15 wt %, 20 wt %, 25 wt %, 30 wt %, 35 wt %, 40 wt %, 45 wt %, or about 50 wt % iron. In some embodiments, the elemental composition of the waste bauxite residue comprises about 1 wt % to about 50 wt % iron. In some embodiments, the elemental composition of the waste bauxite residue comprises about 25 wt % to about 35 wt % iron. In some embodiments, the elemental composition of the waste bauxite residue comprises about 30 wt % iron.

In some embodiments of the methods of the present disclosure for fabricating a multivalent iron bio-inhibitor product from waste bauxite residue, the method includes treating the waste bauxite residue with an acid solution to form a first mixture. In some embodiments, the acid is a mineral acid. In some embodiments, the acid is perchloric acid ($HClO_4$). Thus, in some embodiments, the method includes treating waste bauxite residue with a perchloric acid ($HClO_4$) solution to form a first mixture. In some embodiments, the acid is hydrochloric acid (HCl). In some embodiments, the method includes treating waste bauxite residue with a hydrochloric acid solution to form a first mixture.

In some embodiments, treating the waste bauxite residue with an acid solution produces a mixture containing one or more iron complexes. In some embodiments, the one or more iron complexes includes $Fe(ClO_4)_3.12H_2O$ and $FeCl_3$ complexes. In some embodiments, the waste bauxite residue is treated with perchloric acid to form a mixture containing $Fe(ClO_4)_3.12H_2O$ and $FeCl_3$ complexes.

In some embodiments of the method, after formation of the mixture containing one or more iron complexes, the solid particles are removed from the mixture. In some embodiments, the solid particles are filtered from the liquid mixture. In some embodiments, the filtered liquid mixture contains dissolved iron ions, such as dissolved ferrous ($Fe^{2+}$) ions and dissolved ferric ($Fe^{3+}$) ions.

In some embodiments of the methods of the present disclosure for fabricating a multivalent iron bio-inhibitor product from waste bauxite residue, the method includes treating the first liquid mixture containing dissolved iron ions with a reducing agent to form a second mixture. In some embodiments, the reducing agent is sodium borohydride ($NaBH_4$). Thus, in some embodiments, the method includes treating the first mixture with sodium borohydride to form a second mixture. In some embodiments, the reducing agent is lithium aluminum hydride ($LiAlH_4$). In some embodiments, the method includes treating the first mixture with lithium aluminum hydride to form a second mixture.

In some embodiments, treating the first mixture containing dissolved iron ions with a reducing agent produces a mixture containing zero-valent iron ($zFe^0$). In some embodiments, the zero-valent iron is nanoparticulate zero-valent iron. In some embodiments, the zero-valent iron has a particle size of about 30 nm to about 90 nm, such as about 40 nm to about 80 nm, about 50 nm to about 70 nm, or about 55 nm to about 65. In some embodiments, the zero-valent iron has a particle size of about 60 nm to about 65 nm or about 62 nm. In some embodiments of the method, portions of dissolved $Fe^{2+}$ ions in the mixture are converted to zero-valent iron. In some embodiments, the first mixture containing dissolved $Fe^{2+}$ and $Fe^{3+}$ ions is treated with a reducing agent to form a mixture containing coupled $zFe^0$—$Fe^{2+}$—$Fe^{3+}$. In some embodiments, the reducing agent is sodium borohydride.

In some embodiments of the method, treating the first mixture with a reducing agent forms a second mixture containing coupled $zFe^0$—$Fe^{2+}$—$Fe^{3+}$. In some embodiments, the second mixture contains coupled $zFe^0$—$Fe^{2+}$—$Fe^{3+}$ and one or more heavy metals. In some embodiments, the mixture contains heavy metals that include Al, Na, Zn, Cr, Pb, Ni, Ca, Mg, Mn, and combinations thereof.

The methods of the present disclosure include obtaining a multivalent iron bio-inhibitor product comprising coupled $zFe^0$—$Fe^{2+}$—$Fe^{3+}$ from the second mixture. In some embodiments, the MIBI product contains coupled $zFe^0$—$Fe^{2+}$—$Fe^{3+}$ at a concentration ratio of about 4:3:1 to about 3.5:2.5:1. In some embodiments, the MIBI product contains coupled $zFe^0$—$Fe^{2+}$—$Fe^{3+}$ at a concentration ratio of about 4:3:1. In some embodiments, the MIBI product contains coupled $zFe^0$—$Fe^{2+}$—$Fe^{3+}$ at a concentration ratio of about 3.6:2.6:1. In some embodiments, the MIBI product contains coupled $zFe^0$—$Fe^{2+}$—$Fe^{3+}$ at a concentration ratio of about 3.5:2.5:1. In some embodiments, the MIBI product contains coupled $zFe^0$—$Fe^{2+}$—$Fe^{3+}$ at a combined $zFe^0$—$Fe^{2+}$—$Fe^{3+}$ concentration of about 5 g/L to about 50 g/L, such as about 10 g/L to about 45 g/L, about 20 g/L to about 40 g/L, about 30 g/L to about 35 g/L, or about 5 g/L, about 10 g/L, about 15 g/L, about 20 g/L, about 25 g/L, about 30 g/L, about 35 g/L, about 40 g/L, about 45 g/L or about 50 g/L. The combined iron concentration can be adjusted based on, for example, the type and amount of SRB present in the reservoir being treated.

In some embodiments, the MIBI product contains coupled $zFe^0$—$Fe^{2+}$—$Fe^{3+}$, where the zero-valent iron ($zFe^0$) concentration is about 10 g/L to about 30 g/L, such as about 10 g/L to about 25 g/L, about 15 g/L to about 20 g/L, or about 10 g/L, about 15 g/L, about 18 g/L, about 20 g/L, about 25 g/L, or about 30 g/L. In some embodiments, the zero-valent iron concentration is about 18 g/L. In some embodiments, the zero-valent iron concentration is about 25 g/L.

In some embodiments, the MIBI product contains coupled $zFe^0$—$Fe^{2+}$—$Fe^{3+}$, where the $Fe^{2+}$ concentration is about 5 g/L to about 25 g/L, such as about 5 g/L to about 20 g/L, about 10 g/L to about 15 g/L, or about 5 g/L, about 10 g/L, about 12 g/L, about 13 g/L, about 15 g/L, about 18 g/L, about 20 g/L, or about 25 g/L. In some embodiments, the $Fe^{2+}$ concentration is about 12 g/L. In some embodiments, the Fe' concentration is about 13 g/L. In some embodiments, the $Fe^{2+}$ concentration is about 18 g/L.

In some embodiments, the MIBI product contains coupled $zFe^0$—$Fe^{2+}$—$Fe^{3+}$, where the $Fe^{3+}$ concentration is about 0.5 g/L to about 8 g/L, such as about 0.5 g/L to about 7 g/L, about 1 g/L to about 5 g/L, or about 0.5 g/L, about 1 g/L, about 2 g/L, about 3 g/L, about 4 g/L, about 5 g/L, about 6 g/L, about 7 g/L, or about 8 g/L. In some embodiments, the $Fe^{3+}$ concentration is about 4 g/L. In some embodiments, the $Fe^{3+}$ concentration is about 5 g/L. In some embodiments, the $Fe^{3+}$ concentration is about 7 g/L.

In some embodiments, the MIBI product contains one or more heavy metals. In some embodiments, the MIBI product contains heavy metals that include Al, Na, Zn, Cr, Pb, Ni, Ca, Mg, Mn, and combinations thereof. In some embodiments, the MIBI product contains heavy metals at a combined concentration of about 0.01 g/L to about 5 g/L, such as about 0.01 g/L to about 4 g/L, about 0.01 g/L to about 3 g/L, about 0.01 g/L to about 2 g/L, about 0.01 g/L to about 1 g/L, about 0.01 g/L to about 0.5 g/L, about 0.01 g/L to about 0.1 g/L, about 0.1 g/L to about 5 g/L, about 0.1 g/L to about 4 g/L, about 0.1 g/L to about 3 g/L, about 0.1 g/L to about 2 g/L, about 0.1 g/L to about 1 g/L, about 0.1 g/L to about 0.5 g/L, about 0.5 g/L to about 5 g/L, about 0.5 g/L to about 4 g/L, about 0.5 g/L to about 3 g/L, about 0.5 g/L to about 2 g/L, about 0.5 g/L to about 1 g/L, about 1 g/L to about 5 g/L, about 1 g/L to about 4 g/L, about 1 g/L to about 3 g/L, about 1 g/L to about 2 g/L, about 2 g/L to about 5 g/L, about 2 g/L to about 4 g/L, about 2 g/L to about 3 g/L, about 3 g/L to about 5 g/L, about 3 g/L to about 4 g/L, or about 0.01 g/L, about 0.05 g/L, about 0.1 g/L, about 0.5 g/L, about 1 g/L, about 2 g/L, about 3 g/L, about 4 g/L, or about 5 g/L. In some embodiments, the heavy metals concentration is about 3 g/L. In some embodiments, the heavy metals concentration is about 4 g/L. In some embodiments, the combined concentration of heavy metals in the MIBI product is less than about 5 g/L, such as less than about 4 g/L, less than about 3 g/L, less than about 2 g/L, less than about 1 g/L, less than about 0.5 g/L, less than about 0.1 g/L, or less than about 0.05 g/L.

Thus, provided in the present disclosure is a method of fabricating a multivalent iron bio-inhibitor product containing coupled $zFe^0$—$Fe^{2+}$—$Fe^{3+}$ from waste bauxite residue, the method including: treating waste bauxite residue with an acid solution to form a first mixture; treating the first mixture with a reducing agent to form a second mixture containing coupled $zFe^0$—$Fe^{2+}$—$Fe^{3+}$; and obtaining the multivalent iron bio-inhibitor product containing coupled $zFe^0$—$Fe^{2+}$—$Fe^{3+}$ from the second mixture. In some embodiments, the acid is perchloric acid. In some embodiments, the reducing agent is sodium borohydride. In some embodiments, the MIBI product contains coupled $zFe^0$—$Fe^{2+}$—$Fe^{3+}$ at a concentration ratio of about 4:3:1. In some embodiments, the MIBI product contains heavy metals.

The MIBI products of the present disclosure that contain coupled $zFe^0$—$Fe^{2+}$—$Fe^{3+}$ can inhibit or terminate the growth or activity of sulfur-reducing bacteria, such as in a reservoir. For example, the MIBI products of the present disclosure can be used to inhibit or terminate the growth or activity of sulfur-reducing bacteria in a reservoir such as an oilfield reservoir, a reservoir in a wastewater treatment facility, or a reservoir in a hydrothermal system. The MIBI products of the present disclosure that contain coupled $zFe^0$—$Fe^{2+}$—$Fe^{3+}$ can inhibit the formation of $H_2S$ in the reservoir, removes $H_2S$ present in the reservoir, or a combination thereof. Thus, the MIBI products of the present disclosure can be used to control reservoir souring, such as in oilfield and water treatment applications.

Method for Treating or Preventing Reservoir Souring

Reservoir souring by sulfur-reducing bacteria (SRB) that produce large amounts of hydrogen sulfide can cause numerous problems, including, but not limited to, gas pipeline contamination and deposition problems; corrosion and damage to oilfield facilities and equipment; inhibition or destruction of catalysts used in gas treatment; and periodic operational downtime in hydrocarbon production.

Figure 1:
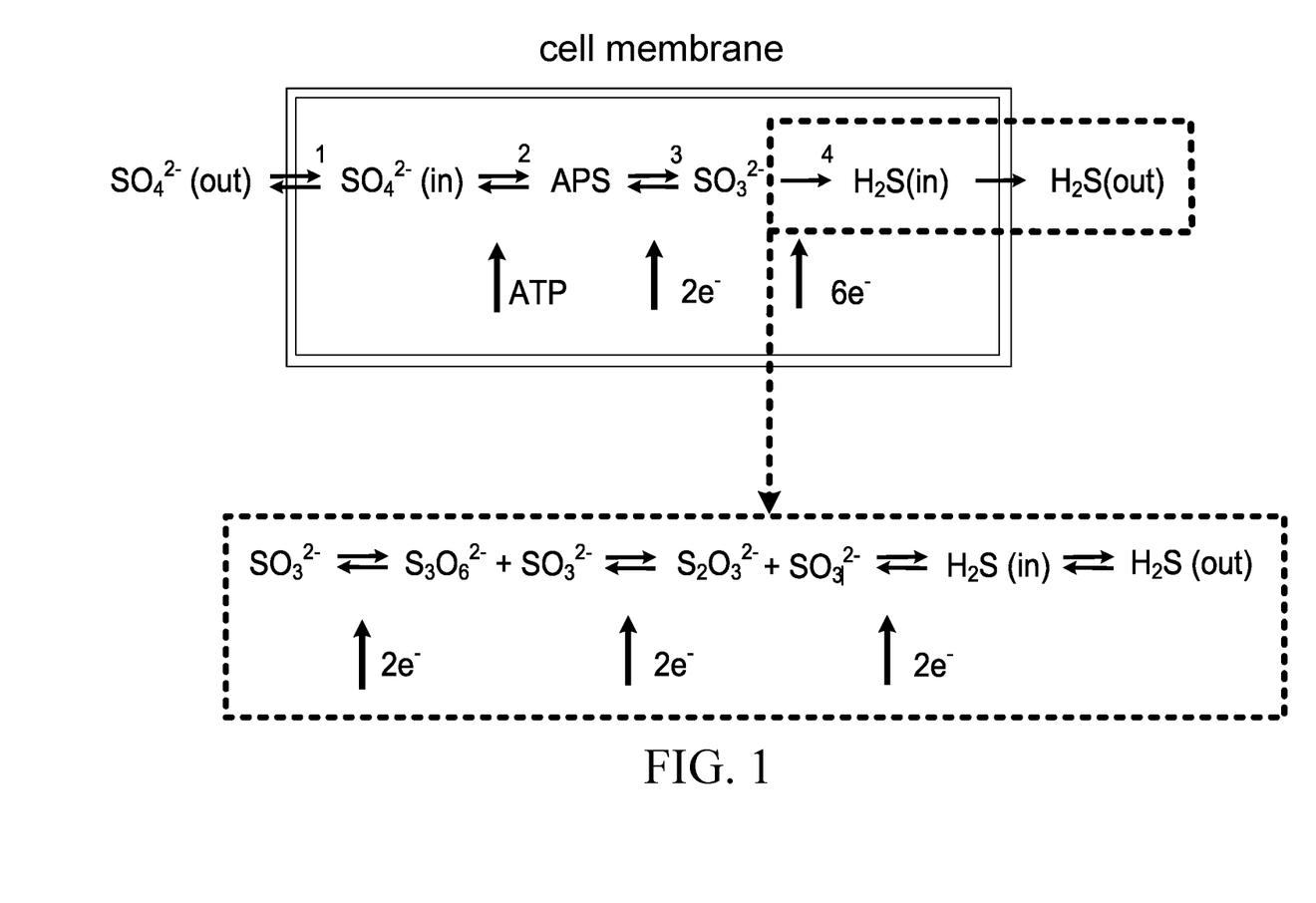
FIG. 1 is a scheme showing the pathways of microbial sulfur transformation of SRBs in a petroleum reservoir.

The first step in microbial sulfur transformation of SRBs in the reservoir is assimilatory sulfate reduction (ASR) in which sulfate is transport across the cell membrane by specific sulfate-binding enzymes. FIG. 1 shows modified sulfate reduction pathways proposed by Brunner and Bernasconi (Geochimica et Cosmochimica Acta 69, 4759-4771 (2005)). Once in the cell cytoplasm, sulfate ($SO_4^{2-}$) can be reduced to $H_2S$ by one of two distinct pathways: the adenosine-5'-phosphosulfate (APS) pathway and the phosphoadenosine-5'-phosphosulfate (PAPS) pathway. In both pathways, sulfate is attached to adenosine-5'-triphosphate (ATP) to form APS which is catalyzed by the enzyme ATP-sulfurylase. During assimilatory reduction, no free sulfide is produced because the sulfide is usually incorporated into carbon skeletons of amino acids to form cysteine or homocysteine.

The second step in microbial sulfur transformation of SRBs in the reservoir is the dissimilatory sulfate reduction (DSR), which usually goes through a number of sulfur intermediate products via electron transfer reactions to yield energy to support microbial growth and other cellular processes of the microbes in the reservoir. As illustrated in FIG. 1, most of the reduction steps are similar in both the ASR and DSR processes, with the exception being that DSR is a reversible process. During the DSR process, the amount of sulfide produced is greater than that produced during ASR, which is why it is excreted out of the cell into the reservoir and natural environments, thus causing reservoir souring, corrosion, and flow assurance challenges in oil and gas production.

Thus, provided in the present disclosure is a method for treating or preventing reservoir souring. The methods of the present disclosure include: providing a multivalent iron bio-inhibitor product containing coupled $zFe^0$—$Fe^{2+}$—$Fe^{3+}$ to a reservoir; and inhibiting or terminating the growth, activity, or both, of sulfur-reducing bacteria present in the reservoir. In some embodiments, the MIBI inhibits or terminates the growth of sulfur-reducing bacteria present in the reservoir. In some embodiments, the MIBI inhibits or terminates the activity of sulfur-reducing bacteria present in the reservoir. In some embodiments, the MIBI inhibits or terminates the growth and activity of sulfur-reducing bacteria present in the reservoir. In some embodiments, inhibiting the growth or activity of the SRB inhibits the formation of $H_2S$.

The methods of the present disclosure include providing a multivalent iron bio-inhibitor product containing coupled $zFe^0$—$Fe^{2+}$—$Fe^{3+}$ to a reservoir. In some embodiments, the MIBI product is the product described in the present disclosure. In some embodiments, the MIBI product is fabricated according to the methods described in the present disclosure. In some embodiments, the MIBI product is fabricated from waste bauxite residue and contains coupled $zFe^0$—$Fe^{2+}$—$Fe^{3+}$. Thus, in some embodiments of the disclosed method, the method includes fabricating the multivalent iron bio-inhibitor product from waste bauxite residue, where the fabricating includes: treating the waste bauxite residue with an acid solution to form a first mixture; treating the first mixture with a reducing agent to form a second mixture containing coupled $zFe^0$—$Fe^{2+}$—$Fe^{3+}$; and obtaining the multivalent iron bio-inhibitor product containing coupled $zFe^0$—$Fe^{2+}$—$Fe^{3+}$ from the second mixture.

In some embodiments, the MIBI product contains coupled $zFe^0$—$Fe^{2+}$—$Fe^{3+}$ at a concentration ratio of about 4:3:1. In some embodiments, the MIBI product is provided to the reservoir at a combined $zFe^0$—$Fe^{2+}$—$Fe^{3+}$ concentration of about 0.1 g/L to about 20 g/L, such as about 1 g/L to about 15 g/L, about 5 g/L to about 10 g/L, about 4 g/L to about 12 g/L, or about 0.1 g/L, about 1 g/L, about 4 g/L, about 5 g/L, about 10 g/L, about 11 g/L, about 12 g/L, about 15 g/L, or about 20 g/L. In some embodiments, the multivalent iron bio-inhibitor product is provided to the reservoir at a combined $zFe^0$—$Fe^{2+}$—$Fe^{3+}$ concentration of about 4 g/L to about 12 g/L. In some embodiments, the multivalent iron bio-inhibitor product is provided to the reservoir at a combined $zFe^0$—$Fe^{2+}$—$Fe^{3+}$ concentration of greater than about 4 g/L. In some embodiments, the multivalent iron bio-inhibitor product is provided to the reservoir at a combined $zFe^0$—$Fe^{2+}$—$Fe^{3+}$ concentration of about 11 g/L.

The MIBI product used in the methods of the present disclosure can inhibit or terminate the growth, activity, or both, of sulfur-reducing bacteria present in the reservoir. The bacteria can be any sulfur-producing bacteria present in a reservoir, such as any sulfur-producing bacteria involved in reservoir souring issues in wastewater treatment facilities or oilfields. In some embodiments, the sulfur-reducing bacteria is *Desulfovibrio* species, *Thiobacillus* species, or a combination thereof. In some embodiments, the sulfur-reducing bacteria is *Desulfovibrio* species. In some embodiments, the sulfur-reducing bacteria is *Thiobacillus* species. In some embodiments, the sulfur-reducing bacteria is a combination of *Desulfovibrio* species and *Thiobacillus* species.

Without wishing to be bound by any particular theory, it is believed that the MIBI product inhibits the growth or activity of the bacteria due to changes in enzymatic, physiological, or metabolic activity of the bacteria that is caused by interaction of the iron species with the cell walls of the SRB. The iron species (particularly nanoparticulate $zFe^0$ and $Fe^{2+}$) can interact with the SRB's cell walls and extracellular polysaccharides to stop their metabolic activity via physical coating and chemisorption reactions. Thus, in some embodiments, the MIBI product containing coupled $zFe^0$—$Fe^{2+}$—$Fe^{3+}$ controls both $H_2S$ via reductive precipitation and SRB activity by eliminating SRB metabolic activity via physical coating, precipitation, and chemisorption reactions.

In some embodiments, the method inhibits the formation of hydrogen sulfide ($H_2S$) in the reservoir. In some embodiments, the method removes $H_2S$ present in the reservoir. As described herein, the sulfur-producing bacteria generates $H_2S$, which is harmful to reservoirs and contributes to reservoir souring. Without wishing to be bound by any theory, it is believed that the reduction of $H_2S$ concentration is due to the reactivity of ferrous ions ($Fe^{2+}$) with hydrogen sulfides ($H_2S$) or bisulfides ($HS^-/S^{2-}$) produced by SRB organisms to form soluble or aqueous phase iron sulfides via reductive precipitation. Additionally, in some embodiments, the availability of nanoparticulate zero-valent iron ($zFe^0$) present in the bio-inhibitor serves as a reductant to reduce the heavy metals present in the MIBI product. In some embodiments, the components of reduced heavy metals (such as $Na^+$, $Zn^{2+}$, $Cr^{2+}$, $Pb^{2+}$, $Ni^{2+}$, and $Mg^{2+}$) can form soluble and aqueous phase metal precipitates with hydrogen sulfide to minimize sulfide formation and heavy metals can be used as a sulfur source and electron source to stimulate the activity of the organisms.

In some embodiments, the methods of the present disclosure result in a reduction of H2S production, such as about a 0.5-fold reduction, about a 1-fold reduction, about a 1.5-fold reduction, about a 2-fold reduction, about a 2.5-fold reduction, about a 3-fold reduction, or more. In some embodiments, the methods of the present disclosure result in inhibition in the activity or growth of SRBs present in a reservoir, such as about a 0.5-fold inhibition, about a 1-fold inhibition, about a 1.5-fold inhibition, about a 2-fold inhibition, about a 2.5-fold inhibition, about a 3-fold inhibition, or more.

In some embodiments of the disclosed methods, the three iron species of the coupled $zFe^0$—$Fe^{2+}$—$Fe^{3+}$ undergoes chemical reduction to remove hydrogen sulfide followed by biological sorption of iron to inhibit the growth of SRB. In some embodiments, the mechanisms occur simultaneously. In some embodiments, the mechanisms occur sequentially. In some embodiments, the reductive chemical precipitation and subsequent dissolved iron sulfide formation is the major removal pathway for hydrogen sulfide. In some embodiments, chemisorption reactions followed by further interactions and coating of bacterial cell walls is the major bio-inhibition or removal approach of SRBs in oilfield settings.

Also provided in the present disclosure is a method for inhibiting or terminating the growth or activity of sulfur-reducing bacteria in a reservoir. In some embodiments, the method includes providing a multivalent iron bio-inhibitor product containing coupled $zFe^0$—$Fe^{2+}$—$Fe^{3+}$ to a reservoir, where the multivalent iron bio-inhibitor product is fabricated from waste bauxite residue. In some embodiments, the MIBI product is fabricated from waste bauxite residue according to the methods described in the present disclosure. In some embodiments, the method inhibits the formation of $H_2S$ in the reservoir, removes $H_2S$ present in the reservoir, or a combination thereof.

The methods of the present disclosure can be used in any reservoir where there is reservoir souring. In some embodiments, the reservoir is an oilfield reservoir, a reservoir in a wastewater treatment facility, or a reservoir in a hydrothermal system. The methods of the present disclosure can be used to control or mitigate reservoir souring in, for example, formation waters in conventional reservoirs as well as flow-back water in unconventional reservoirs. In some embodiments, the methods and MIBI products of the present disclosure can be used in multiple reservoir souring treatments, including, for example, wastewater re-injection for enhanced oil recovery (EOR) and flow-back water treatment from unconventional shale exploration.

EXAMPLES

Example 1—Waste Bauxite Residue Analysis

Figure 2:
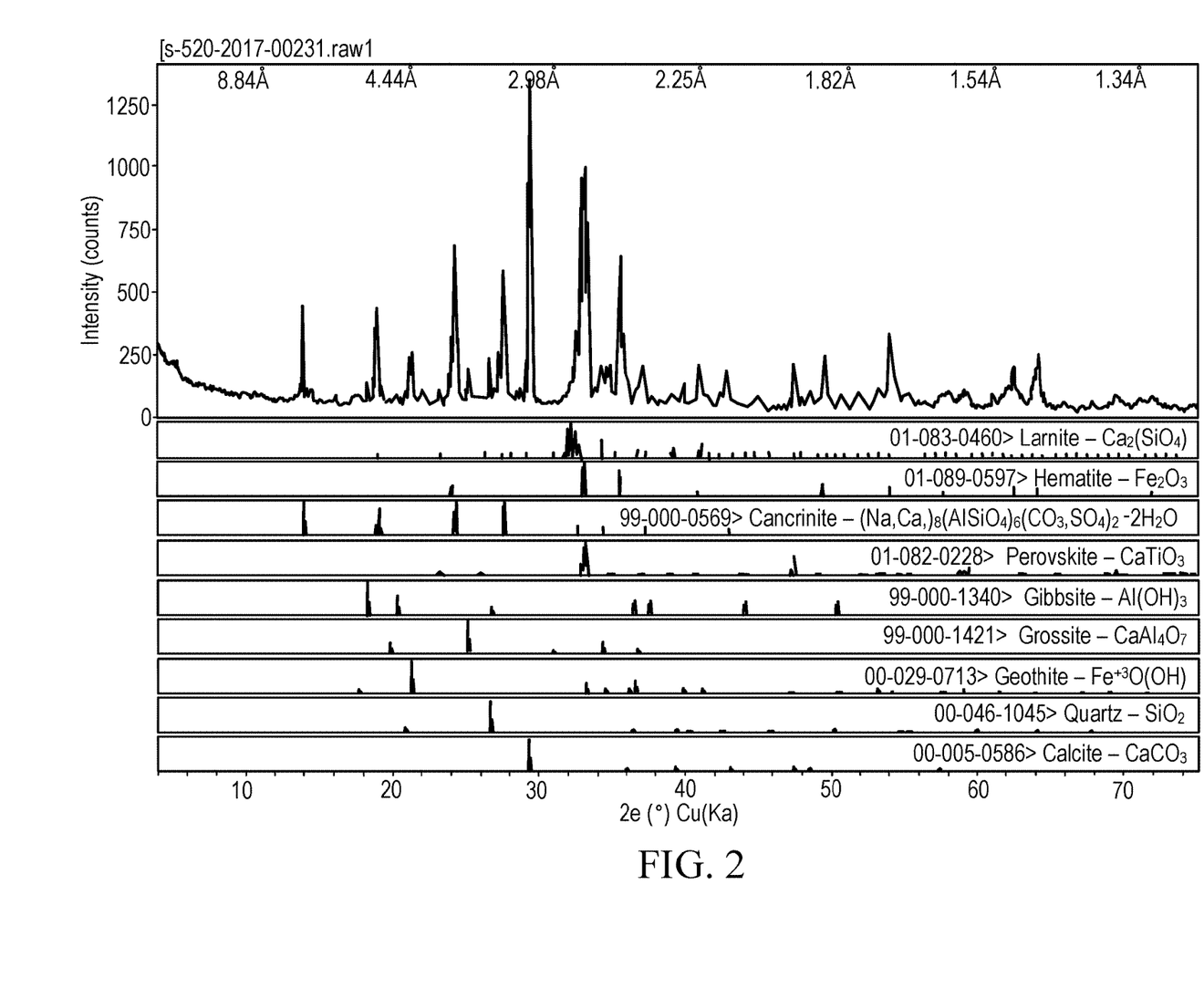
FIG. 2 shows the X-ray diffraction (XRD) pattern of dry waste bauxite residue.

Waste bauxite residue (pH=13.2) was collected from Ma'aden Saudi Arabian Aluminum Company immediately after alumina recovery from the digestions process and stored under anoxic conditions. The mixture contained about 45% free water and about 55% paste materials that were characterized by X-ray diffraction (XRD) (see Table 1 and FIG. 2) and wavelength dispersive X-ray fluorescence spectroscopy (WDXRF) (see Table 2) after being dried at 85° C. for 24 hours under nitrogen.

TABLE 1

Mineralogical composition of waste bauxite residue estimated by XRD

| Compound | Weight Percentage (wt %) |
|---|---|
| Larnite - $Ca_2(SiO_4)$ | 27 |
| Cancrinite - $(Na, Ca)_8(AlSiO_4)_6(CO_3, SO_4)_2 \cdot 2H_2O$ | 22 |
| Hematite - $Fe_2O_3$ | 21 |
| Goethite - FeO(OH) | 15 |
| Calcite - $CaCO_3$ | 5 |
| Perovskite - $CaTiO_3$ | 4 |
| Grossite - $CaAl_4O_7$ | 3 |
| Quartz - $SiO_2$ | 2 |
| Gibbsite - $Al(OH)_3$ | 1 |

TABLE 2

Elemental composition of waste bauxite residue estimated by WDXRF

| Element | Weight Percentage (wt %) |
|---|---|
| Fe | 30.17 |
| Al | 21.78 |
| Na | 17.19 |
| Si | 14.89 |
| Ca | 10.29 |
| Ti | 2.21 |
| S | 0.9 |
| Zn | 0.73 |
| Sr | 0.52 |
| Mg | 0.40 |
| P | 0.16 |
| Cr | 0.07 |
| K | 0.03 |
| Mn | 0.03 |
| Ce | 0.03 |
| Pb | 0.02 |
| Ni | 0.02 |
| Th | 0.02 |

Example 2—Chemical Fabrication and Preparation of a Multivalent Iron Bio-Inhibitor (MIBI)

Approximately 75 grams of dried and pulverized red-mud was added under an anoxic atmosphere into a 500 mL round-bottom flask equipped with a mechanical stirrer and pH-meter, and containing 150 mL of a 2.25 M perchloric acid ($HClO_4$) solution (Sigma-Aldrich, St. Louis, Mo., USA) that was under constant flow of nitrogen gas. The solution was stirred until a yellowish-red slurry mixture of $Fe(ClO_4)_3 \cdot 12H_2O$ and $FeCl_3$ complexes were obtained after 6 hours at a pH of 8.5 according to reactions (1) and (2), respectively.

$$Fe_2O_3 \cdot xH_2O + 3HClO_4 \rightarrow Fe(ClO_4)_3 \cdot xH_2O + Fe^{2+} + 3OH^- \quad (1)$$

$$2FeO(OH) + 3HClO_4 \rightarrow FeCl_3 + Fe^{2+} + 3OH^- + H_2O \quad (2)$$

The mixture was allowed to settle in the reaction flask under a constant flow of nitrogen. The solid particles were separated from the liquid reaction mixture in a glove box using a suction filtration apparatus. The supernatant liquid containing predominately dissolved ferrous ion ($Fe^{2+}$) and ferric ion ($Fe^{3+}$) and other dissolved heavy metals from the red-mud were transferred into a clean 500 mL reaction flask, followed by dropwise addition of a 0.25 M sodium borohydride ($NaBH_4$) solution (Sigma-Aldrich). All transfers of reaction mixtures were performed in a glove box under a constant flow of nitrogen to avoid rapid oxidation of ferrous iron ($Fe^{2+}$) to ferric iron ($Fe^{3+}$). After addition of the $NaBH_4$, the mixture was stirred for approximately 1 hour to convert a portion of the dissolved $Fe^{2+}$ into zero-valent iron ($zFe^0$) according to reaction (3).

$$2Fe^{2+} + BH_4^- + 3H_2O \rightarrow 2Fe^0 + H_2BO_3^- + 4H^+ + 2H_{2(g)} \quad (3)$$

After rigorous stirring of the reaction in the dark room, aliquots of the mixture were tested by transmission electron microscope (TEM) to show that the nanoparticulate zero-valent iron ($zFe^0$) present in the reaction had a size of 62±23 nm.

Using the same samples, the speciation of the coupled iron species in the mixture ($zFe^0$—$Fe^{2+}$—$Fe^{3+}$), together with other heavy metals ions present in the final product, were determined. Ferrous ions concentration ($Fe^{2+}$) in the mixture was determined spectrophotometrically using the Ferrozine method at 562 nm wavelength. Briefly, the combined ferric ($Fe^{3+}$) and ferrous ($Fe^{2+}$) ions were determined by thioglycolic acid ($HSCH_2COOH$; Sigma-Aldrich) reduction of Fe(III) to Fe(II), followed by Ferrozine ($Fz^{2-}$) complexation of Fe(II) and subsequent analyses at the same wavelength according to reactions (4) and (5), respectively.

$$2Fe^{3+} + 2HSCH_2COOH \rightarrow Fe^{2+} + HOOCCH_2S\text{—}SCH_2COOH + 2H^+ \quad (4)$$

$$Fe^{2+} + 3Fz^{2-} \rightarrow [Fe(Fz)_3]^{4+} \quad (5)$$

Total iron concentration ($Fe_{(TOT)}$) was determined after acidification using inductively coupled plasma optical emission spectrometry (ICP-OES). The zero-valent iron ($zFe^0$) concentration present in the complex mixture was successfully calculated using equation 1.

$$\text{Zero-Valent Iron }(zFe^0) = Fe_{(TOT)} - (Fe^{2+} + Fe^{3+}) \quad (\text{Eq. 1})$$

The heavy metal composition present in the final iron bio-inhibitor mixture was determine by ICP methods. Tables 3 and 4 display the concentration results of iron species and trace metal concentration present in the multivalent iron bio-inhibition (MIBI) mixture. The remaining portion of the characterized product was used immediately for microbial incubation and $H_2S$ treatment experiments.

TABLE 3

Iron speciation from chemically fabricated bio-inhibitor from waste bauxite residue used in incubation experiments

| Iron Species | Zero-Valent Iron ($zFe^0$) | Ferrous ion ($Fe^{2+}$) | Ferric ion ($Fe^{3+}$) |
|---|---|---|---|
| Concentration (g/L) | 18.31 | 12.76 | 4.75 |

TABLE 4

Heavy metal composition of chemically fabricated MIBI products from waste bauxite residue used in incubation experiments

| | Heavy Metals | | | | | | | | |
|---|---|---|---|---|---|---|---|---|---|
| | Al | Na | Zn | Cr | Pb | Ni | Ca | Mg | Mn |
| Content (g/L) | 2.35 | 1.21 | 0.24 | 0.13 | 0.09 | 0.06 | 0.05 | 0.03 | 0.01 |

Example 3—Simulated Microbial Inhibition and $H_2S$ Treatment Experiments

In order to evaluate the inhibition efficiency and dose effect for the MIBI product on SRB activity and growth and the effects on $H_2S$ production, simulated incubation experiments under controlled reservoir conditions using typified sulfur reducing bacterial enrichment cultures from oilfields were developed.

To achieve this, two 1 L enrichment cultures were sampled containing *Desulfovibrio* and *Thiobacillus* species capable of causing intense reservoir souring problems in injected produced waters in ultra-sour conventional wells as well as in flow-back waters from unconventional oilfields. The 1 L culture samples were stored in anaerobic bags and kept at 4° C. during transportation into the laboratory for further microbial growth experimentation.

Resting suspension cultures for *Desulfovibrio* and *Thiobacillus* species were grown at 35° C. in 5 L Erlenmeyer flasks that contained a mixture of seawater and sulfide free-formation water to which 1.0 g/L yeast extract and 1.5 g/L sodium lactate ($NaC_3H_5O_3$; Sigma-Aldrich) were added. The cultures were incubated in the dark using a thermostatic bath under a gas $N_2/CO_2$ (80%/20%) atmosphere until an initial steady state $SO_4^{2-}$ concentration was achieved. Before starting the microbial inhibition experiments, the maximum growth levels (about 14 days) for SRBs were detected by turbidity measurements to be between 1.3 to 1.8 NTU (Nephelometric Turbidity Units).

A 1000 mL sample of each of the mid-log phase cultures was divided into five parts, and aliquots of each were added to a double-jacketed glass sterile BIOSTAT® Q bioreactor equipped with a pH-meter, thermometer, magnetic stirrer, $O_2$-sensor, and sample transfer lines to monitor the microbial inhibition rates, sulfate reduction rate (SRR) and sulfide production rates (SPR).

The freshly prepared multivalent iron bio-inhibition (MIBI) mixture described in Example 2 was added to each of the mid-log phase culture samples based on combined $zFe^0$—$Fe^{2+}$—$Fe^{3+}$ bio-inhibitor concentrations of 0.0 g/L, 1.0 g/L, 2.0 g/L, 3.0 g/L, 4.0 g/L, and 5.0 g/L when approximately 5.0 mM sulfide concentration had been produced from each culture sample. The initial pH was re-adjusted to 8.10 with an average concentration ratio for the coupled $zFe^0$—$Fe^{2+}$—$Fe^{3+}$ determined to be 4:3:1, respectively, for different batches.

The simulated field incubation experiments for the two culture species were carried out for 0, 2, 4, 6, 8 and 10 hours at reservoir subsurface temperature of 45° C. During the incubation period, 20 mL aliquots of culture sample were taken at each time point indicated to evaluate the growth or cell damage using flow cytometry. Reduced hydrogen sulfide produced by SRBs was quantified by methylene blue spectrophotometry analyses. Cultures in which sulfide production did not recover during the incubation period were considered to be potently inhibited by the MIBI product. All the experiments were repeated for *Desulfovibrio* and *Thiobacillus* species.

Figure 3:
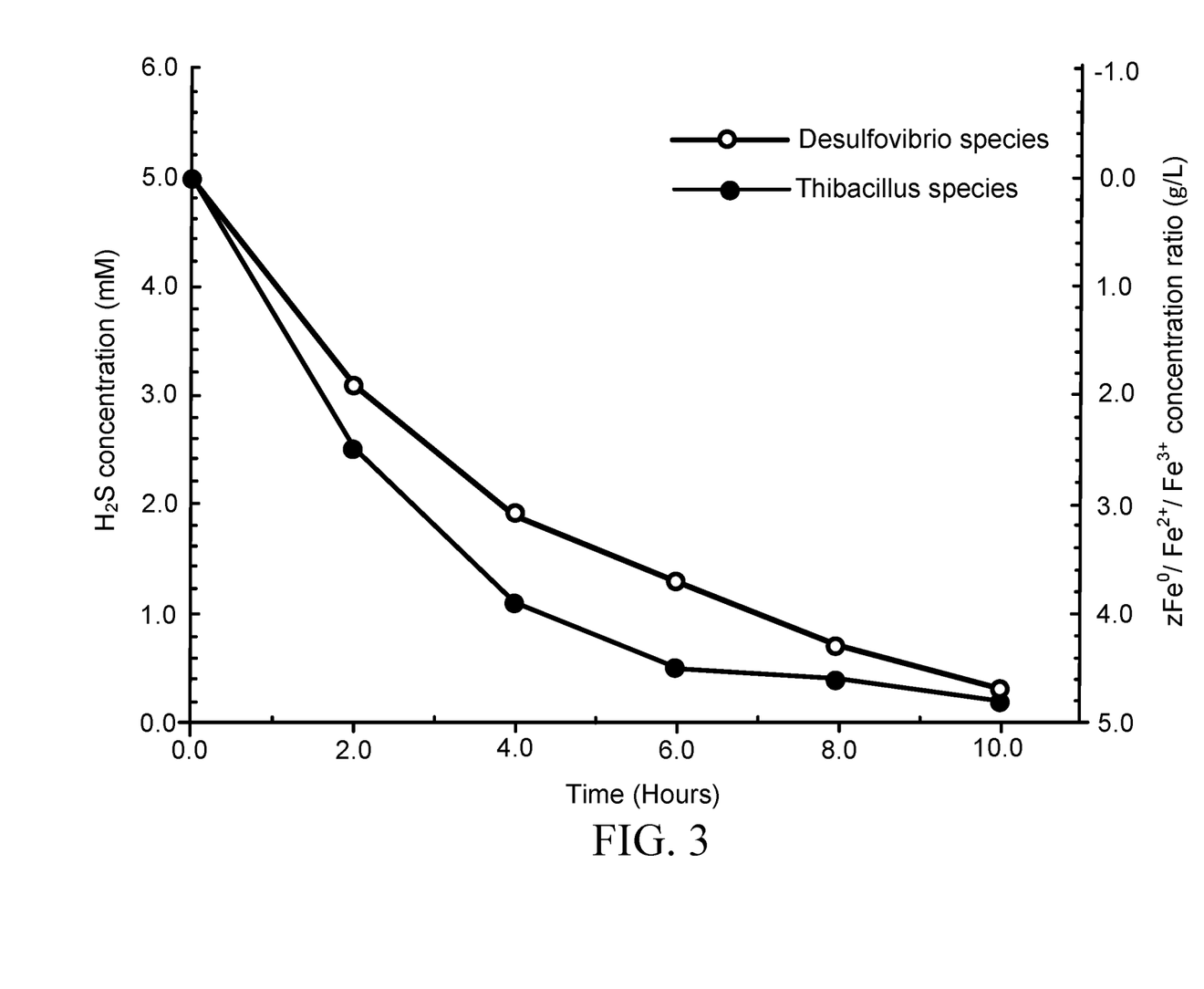
FIG. 3 is a graph showing $H_2S$ concentration in *Desulfovibrio* and *Thiobacillus* cultures as a function of time and combined $zFe^0$—$Fe^{2+}$—$Fe^{3+}$ bio-inhibitor concentration at subsurface reservoir temperature.

As can be seen in FIG. 3, there was a progressive reduction in hydrogen sulfide concentration in the *Desulfovibrio* and *Thiobacillus* species upon addition of the MIBI in the SRB treatment experiments at subsurface reservoir conditions during the 10-hour incubation period.

Without wishing to be bound by any theory, it is believed that the significant decline or scavenging capacity of the $H_2S$ was due to the reactivity of ferrous ions ($Fe^{2+}$) with hydrogen sulfides ($H_2S$) or bisulfides ($HS^-/S^{2-}$) produced by both SRB organisms to form soluble or aqueous phase iron sulfides via reductive precipitation such as detailed in reaction (6).

$$Fe^{2+}_{(aq)} + H_2S/HS^-/S^{2-}_{(aq,gaseous)} \rightarrow Fe(HS)^n_x \rightarrow FeS_{(aq)} \qquad (6)$$

In addition, the availability of nanoparticulate zero-valent iron ($zFe^0$) present in the bio-inhibitor served as a reductant to reduce some of the heavy metals present in the MIBI products (see Table 4). The components of reduced heavy metals (such as $Na^+$, $Zn^{2+}$, $Cr^{2+}$, $Pb^{2+}$, $Ni^{2+}$, $Mg^{2+}$) can also form soluble and aqueous phase metal precipitates with hydrogen sulfide to minimize sulfide formation and heavy metals can be used as a sulfur source and electron source to stimulate the activity of the organisms.

Figure 4:
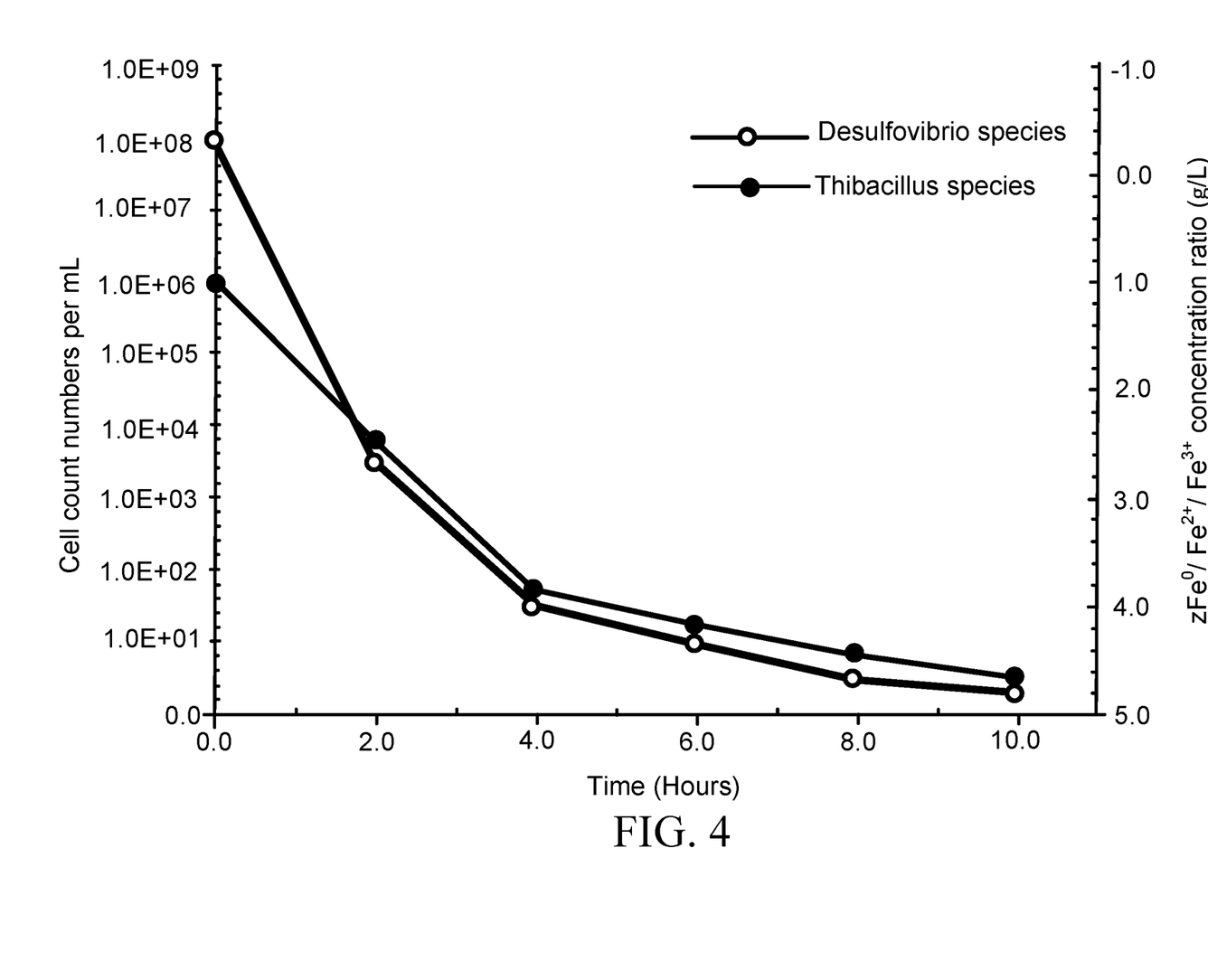
FIG. 4 is a graph showing cell count in *Desulfovibrio* and *Thiobacillus* cultures as a function of time and combined $zFe^0$—$Fe^{2+}$—$Fe^{3+}$ bio-inhibitor concentration at subsurface reservoir temperature.

FIG. 4 illustrates the inhibition and growth effect on *Desulfovibrio* and *Thiobacillus* species upon addition of MIBI under reservoir subsurface conditions with a temperature of 46° C. and pressure of 1328 psi. The results suggested that the use of the coupled $zFe^0$—$Fe^{2+}$—$Fe^{3+}$ bio-inhibitor significantly affected the growth rate of SRBs during treatment in a simulated oilfield, although lower concentrations did not appear to have a rapid knockout effect on either organism. However, higher concentrations (for example, above 4.0 g/L) exerted diverse toxic effects on the activity of the SRBs.

As demonstrated, the application of high concentrations (for example, above 4.0 g/L) of the MIBI can have a toxic effect on the growth and activity of *Desulfovibrio* and *Thiobacillus*, bacteria that are responsible for reservoir souring issues in wastewater treatment facilities or in oilfields.

Under the natural reservoir and wastewater injection treatment conditions tested, a high dosage of MIBI (up to 11.15 g/L of the $zFe^0$—$Fe^{2+}$—$Fe^{3+}$ bio-inhibitor) showed a 2-fold increase in $H_2S$ reduction and a 3-fold inhibition of the effects of free-living SRBs present in the reservoir. However, with the wastewater treatment, the residual iron and precipitated components present in the treated water were allowed settle to the bottom before filtering the supernatant water sample for downhole injection operations in the oilfield.

The mechanisms for the reservoir souring treatment method tested occurred simultaneously; however, the reductive chemical precipitation and subsequent dissolved iron sulfide formation was the major removal pathway for hydrogen sulfide, whereas chemisorption reactions followed by further interactions and coating of bacterial cell walls was the major bio-inhibition or removal approach of SRBs in oilfield settings.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for treating or preventing reservoir souring, comprising:
    providing a multivalent iron bio-inhibitor product comprising coupled $zFe^0$—$Fe^{2+}$—$Fe^{3+}$ to a reservoir; and
    inhibiting or terminating the growth, activity, or both, of sulfur-reducing bacteria present in the reservoir.

2. The method of claim 1, wherein the multivalent iron bio-inhibitor product comprises coupled $zFe^0$—$Fe^{2+}$—$Fe^{3+}$ at a concentration ratio of about 4:3:1 to about 3.5:2.5:1.

3. The method of claim 1, wherein the multivalent iron bio-inhibitor product is provided to the reservoir at a combined $zFe^0$—$Fe^{2+}$—$Fe^{3+}$ concentration of about 0.1 g/L to about 20 g/L.

4. The method of claim 1, wherein the multivalent iron bio-inhibitor product is provided to the reservoir at a combined $zFe^0$—$Fe^{2+}$—$Fe^{3+}$ concentration of about 4 g/L to about 12 g/L.

5. The method of claim 1, wherein the multivalent iron bio-inhibitor product comprises heavy metals at a combined concentration of about 0.01 g/L to about 3 g/L.

6. The method of claim 1, wherein the multivalent iron bio-inhibitor product is fabricated from waste bauxite residue.

7. The method of claim 1, wherein the sulfur-reducing bacteria is *Desulfovibrio* species, *Thiobacillus* species, or a combination thereof.

8. The method of claim 1, wherein the method inhibits the formation of hydrogen sulfide ($H_2S$) in the reservoir.

9. The method of claim 1, wherein the method removes $H_2S$ present in the reservoir.

10. The method of claim 1, wherein the reservoir is an oilfield reservoir, a reservoir in a wastewater treatment facility, or a reservoir in a hydrothermal system.

11. The method of claim 1, further comprising fabricating the multivalent iron bio-inhibitor product from waste bauxite residue, wherein the fabricating comprises:
    treating the waste bauxite residue with an acid solution to form a first mixture;
    treating the first mixture with a reducing agent to form a second mixture comprising coupled $zFe^0$—$Fe^{2+}$—$Fe^{3+}$; and
    obtaining the multivalent iron bio-inhibitor product comprising coupled $zFe^0$—$Fe^{2+}$—$Fe^{3+}$ from the second mixture.

12. A method for inhibiting or terminating the growth or activity of sulfur-reducing bacteria in a reservoir, comprising providing a multivalent iron bio-inhibitor product comprising coupled $zFe^0$—$Fe^{2+}$—$Fe^{3+}$ to a reservoir, wherein the multivalent iron bio-inhibitor product is fabricated from waste bauxite residue.

13. The method of claim 12, wherein the method inhibits the formation of $H_2S$ in the reservoir, removes $H_2S$ present in the reservoir, or a combination thereof.

14. The method of claim 12, wherein the sulfur-reducing bacteria is *Desulfovibrio* species, *Thiobacillus* species, or a combination thereof.

15. The method of claim 12, wherein the multivalent iron bio-inhibitor product comprises coupled $zFe^0$—$Fe^{2+}$—$Fe^{3+}$ at a concentration ratio of about 4:3:1.

* * * * *